(12) United States Patent
Ocher et al.

(10) Patent No.: US 11,120,024 B2
(45) Date of Patent: Sep. 14, 2021

(54) DUAL-STACK ARCHITECTURE THAT INTEGRATES RELATIONAL DATABASE WITH BLOCKCHAIN

(71) Applicant: SAP SE, Walldorf (DE)

(72) Inventors: Alexander Ocher, San Jose, CA (US); Viktor Lapitski, Mountain View, CA (US); Andrey Belyy, Sunnyvale, CA (US)

(73) Assignee: SAP SE, Walldorf (DE)

( * ) Notice: Subject to any disclaimer, the term of this patent is extended or adjusted under 35 U.S.C. 154(b) by 356 days.

(21) Appl. No.: 16/178,311

(22) Filed: Nov. 1, 2018

(65) Prior Publication Data

US 2020/0142992 A1    May 7, 2020

(51) Int. Cl.
| | |
|---|---|
| G06F 16/2455 | (2019.01) |
| G06F 16/27 | (2019.01) |
| G06F 16/23 | (2019.01) |
| H04L 9/06 | (2006.01) |
| H04L 29/06 | (2006.01) |
| H04L 9/32 | (2006.01) |

(52) U.S. Cl.
CPC ...... *G06F 16/24556* (2019.01); *G06F 16/235* (2019.01); *G06F 16/27* (2019.01); *H04L 9/0637* (2013.01); *H04L 9/0643* (2013.01); *H04L 2209/38* (2013.01)

(58) Field of Classification Search
CPC .. G06F 16/24556; G06F 16/27; G06F 16/235; H04L 9/0637; H04L 9/0643; H04L 2209/38; H04L 63/12; H04L 9/3239
See application file for complete search history.

(56) References Cited

U.S. PATENT DOCUMENTS

| | | | |
|---|---|---|---|
| 10,419,209 B1* | 9/2019 | Griffin | H04L 9/006 |
| 2017/0228371 A1* | 8/2017 | Seger, II | G06F 16/2379 |
| 2017/0264428 A1* | 9/2017 | Seger, II | G06F 16/13 |
| 2017/0364698 A1* | 12/2017 | Goldfarb | H04L 9/3239 |
| 2018/0096163 A1* | 4/2018 | Jacques de Kadt | G06Q 40/02 |
| 2018/0096347 A1* | 4/2018 | Goeringer | H04L 9/3247 |
| 2018/0205552 A1* | 7/2018 | Struttmann | H04L 9/0637 |
| 2018/0227118 A1* | 8/2018 | Bibera | G06F 16/21 |
| 2018/0253451 A1* | 9/2018 | Callan | H04L 63/123 |
| 2018/0359096 A1* | 12/2018 | Ford | H04L 9/3236 |
| 2019/0179939 A1* | 6/2019 | Govindarajan | G06F 11/1474 |
| 2020/0042625 A1* | 2/2020 | Balaraman | G06F 21/645 |
| 2020/0050613 A1* | 2/2020 | Gauvreau, Jr. | H04L 9/0637 |
| 2020/0052884 A1* | 2/2020 | Tong | H04L 63/123 |
| 2020/0104297 A1* | 4/2020 | Keskar | H04L 9/0637 |
| 2020/0117733 A1* | 4/2020 | Mueller | G06F 16/258 |
| 2020/0119904 A1* | 4/2020 | Philyaw | H04L 9/0637 |
| 2020/0357084 A1* | 11/2020 | Lerato Hunn | G06Q 50/18 |

* cited by examiner

*Primary Examiner* — Dennis Truong
(74) *Attorney, Agent, or Firm* — Fountainhead Law Group P.C.

(57) ABSTRACT

A database includes a blockchain infrastructure that allows data tables comprising the database to be associated with respective blockchains. Data inserted into a data table is replicated in its associated blockchain. Certain operations on a data table are disabled when it is associated with a blockchain.

15 Claims, 9 Drawing Sheets

DUAL-STACK ARCHITECTURE THAT INTEGRATES RELATIONAL DATABASE WITH BLOCKCHAIN

BACKGROUND

A vast majority of enterprise systems use database system to read, modify, and store data in a relational database. This relational database organizes data into one or more tables (or "relations") of columns and rows. Generally, each table/relation represents one "entity type" (such as customer or product). The rows represent instances of that type of entity (such as "Lee" or "chair") and the columns represent values attributed to that instance (such as address or price). SQL (structured query language) is a common language used to access data in relational databases.

Blockchain technology provides benefits such as security and immutability. Blockchain comprises a decentralized and distributed list of records, called blocks, which are linked and can be secured using cryptography. A blockchain can be described as an append-only transaction ledger. In other words, the ledger can be written onto with new information, but the previous information, stored in blocks, cannot be edited, adjusted or changed (immutability). This can be accomplished by using cryptography and/or hashing to link the contents of the newly added block with each block before it, such that any change to the contents of a previous block in the chain would invalidate the data in all blocks after it.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Systems in accordance with the present disclosure create blockchain storage for one or more constituent data tables comprising a database. The blockchain storage component is separate from the database component but nonetheless integrated with the database to continuously replicate data between data tables in the database and associated blockchains that comprise the blockchain storage. Any insert into a data table can be synchronized with its associated blockchain and any addition to the blockchain is synced with its associated data table. This bi-directional synchronization can be referred to as a "dual stack" architecture to reflect the fact that the system contains both a database and blockchain nodes. The dual stack has the advantage of data integrity: no matter where the record is added, whether to the database table or to blockchain, the system remains consistent. Furthermore, audits can be performed periodically by the database management system to double-check that the data in the data table and in blockchain are the same. The results of such audit may be summarized in a report which is periodically reviewed by system administrator.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
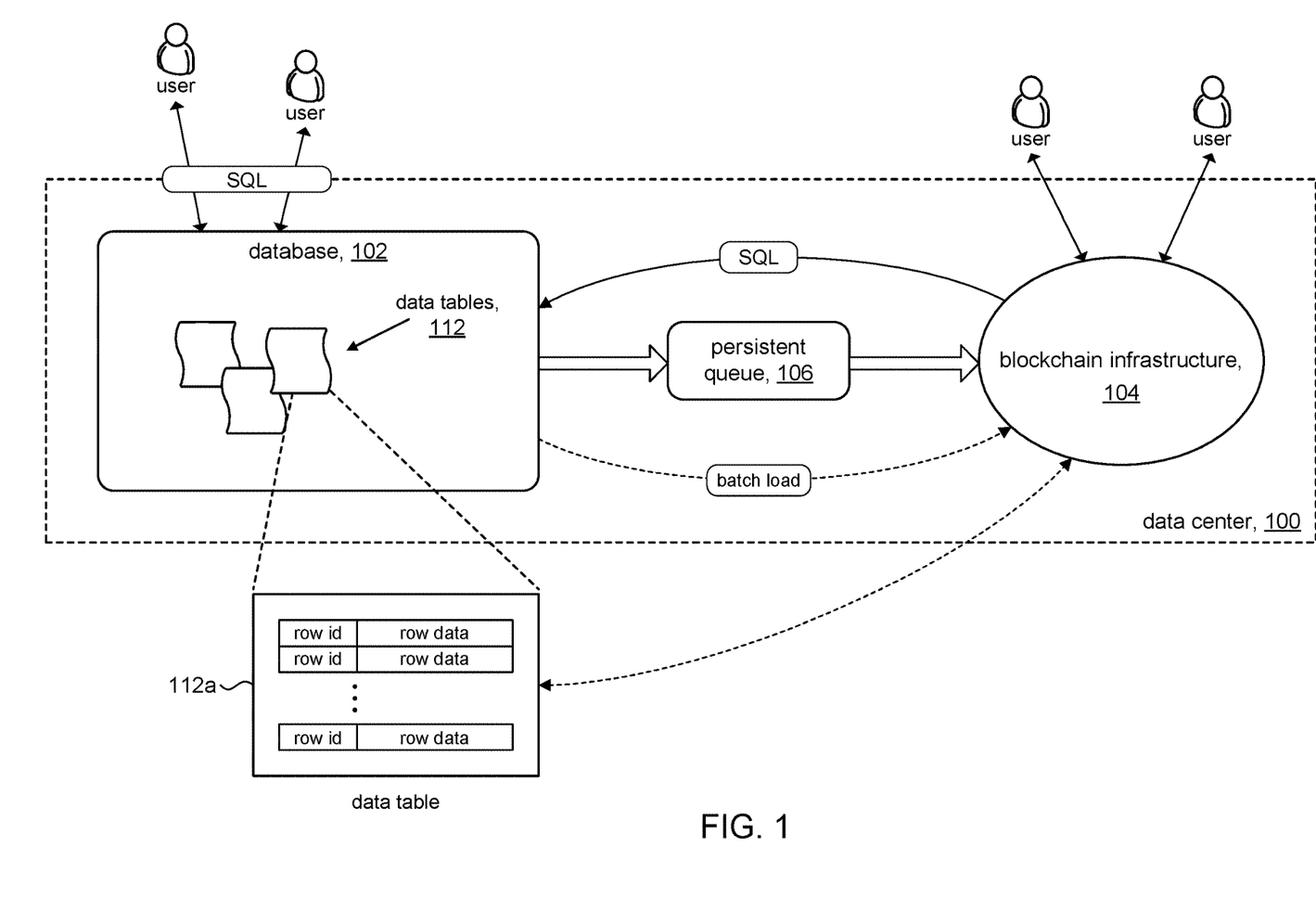
FIG. 1 shows a database system in accordance with the present disclosure.

FIG. 1 shows a data center 100 in accordance with embodiments of the present disclosure. The data center 100 can include a database management system (database) 102, a blockchain infrastructure 104, and a persistent queue 106. The database 102 can be any suitable database. In some embodiments, for example, the database 102 can be a relational database, although it will be appreciated that embodiments in accordance with the present disclosure can use other kinds of databases. For discussion purposes, we can assume without loss of generality, that database 102 is a relational database management system (RDBMS). Accordingly, the database 102 can comprise several data tables 112 and other supporting data structures such as index tables, hash tables, and the like (not shown). A data table 112a can comprise rows of data including a row identifier and the data (row data, record) provided by users. Access to the database 102 can be based on a suitable structured query language (SQL).

In some embodiments, the database 102 can be a distributed database. Data tables comprising such a database can be replicated and/or sharded across multiple computer systems. We can assume without loss of generality that database 102 is not a distributed database, in order to avoid complicating the discussion with details for a distributed database.

In accordance with the present disclosure, the data center 100 can include a blockchain infrastructure 104. In some embodiments, the blockchain infrastructure 104 can comprise a network of computers (e.g., blockchain nodes, FIG. 2). In some embodiments, the blockchain infrastructure 104 can be part of the data center infrastructure; e.g., the blockchain infrastructure 104 can use the private network with in the data center 100. In other embodiments (not shown), the blockchain infrastructure 104 can be separate from the data center 100. In accordance with the present disclosure, data tables 112 in database 102 can be associated with respective blockchains (e.g., FIG. 4). A blockchain that is associated with a data table 112 in database 102 can store the data contained in that data table. For example, FIG. 1 indicates that data table 112a can be associated with a blockchain maintained in the blockchain infrastructure 104.

A blockchain can be copied among the network of blockchain nodes that comprise the blockchain infrastructure 104 so that the blockchain nodes, each, stores and manages its own local copy of the blockchain.

The persistent queue 106 serves as a buffer between the database 102 and blockchain infrastructure 104. In accordance with the present disclosure, database inserts into a data table that is associated with a blockchain are replicated in the blockchain. However, the database 102 can write to a data table 112 much faster than the same can be written to the blockchain. The persistent queue 106 can provide buffering to prevent data overflows due to slower processing in the blockchain infrastructure 104. As the name suggests, the persistent queue 106 comprises a persistent memory (e.g., non-volatile memory) so that if a power failure or other system outage occurs, the data will persist and can be processed when the system comes back online, thus ensuring data consistency across system reboots.

In some embodiments, a single persistent queue 106 can be used to connect the database 102 to the blockchain infrastructure 104. Data that is enqueued can be tagged or otherwise identified with the data table 112 that the data belongs to. In other embodiments, a persistent queue 106 can be defined for each data table 112. In still other embodiments, a persistent queue may be defined for one set of data tables, another persistent queue may be defined for a second set of data tables, and so on.

Figure 2:
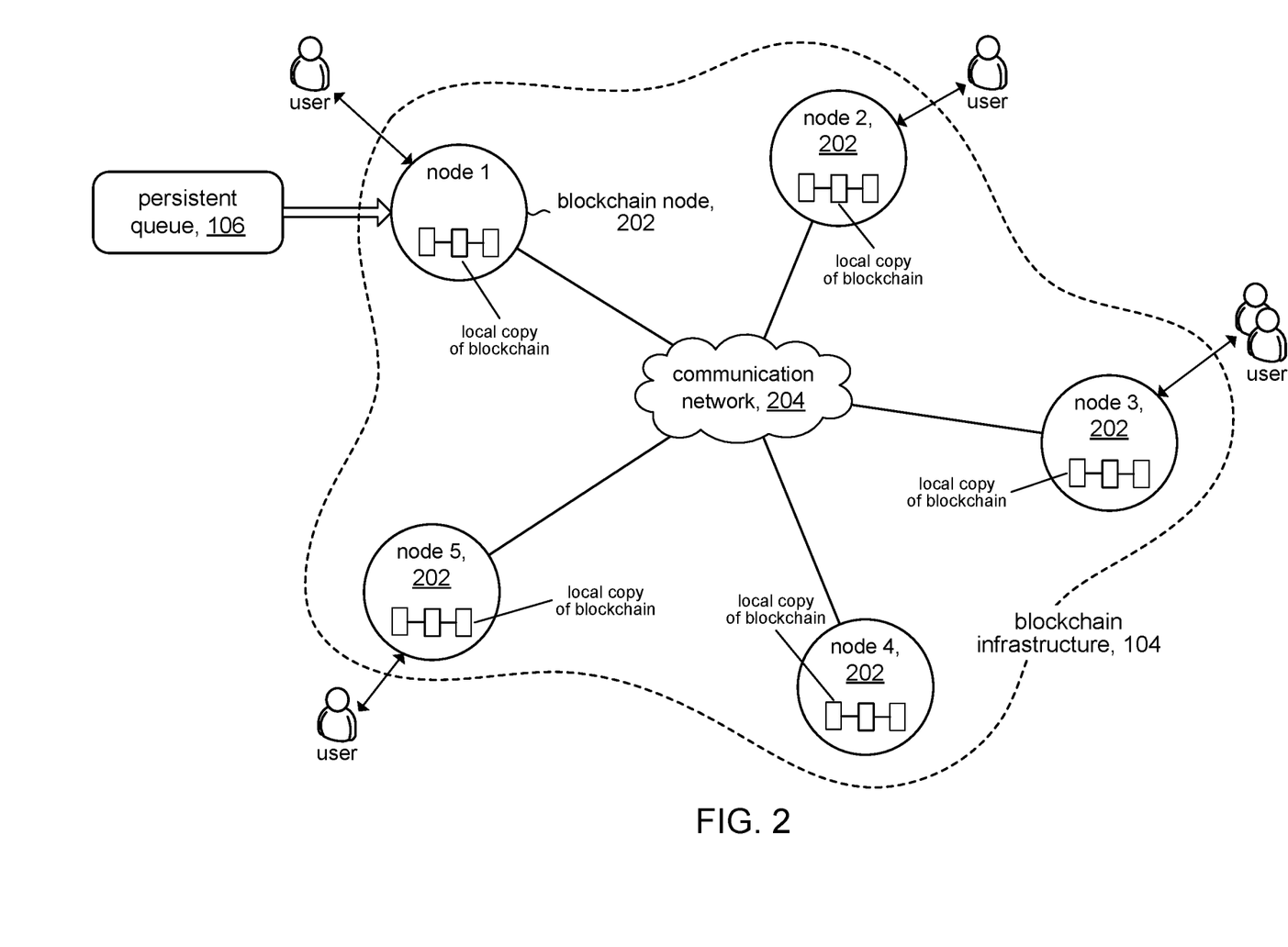
FIG. 2 shows a blockchain infrastructure in accordance with the present disclosure.

FIG. 2 shows an example of a blockchain infrastructure 104 in accordance with some embodiments. The blockchain infrastructure 104 can comprise a network of blockchain nodes 202. The figure shows a network of five blockchain nodes 202, but in other embodiments there can be more (or fewer) nodes 202. The blockchain nodes 202 can be connected to a communication network 204 to provide for peer-to-peer communications among the nodes 202.

As explained above, a data table 112 can be associated with a blockchain. That blockchain can replicated among the blockchain nodes 202. In some embodiments, each blockchain node 202 contains and manages its own local copy of that blockchain. In other embodiments, a blockchain associated with the data table 112 may only be replicated among only a subset of the blockchain nodes 202 in the blockchain infrastructure 104.

Generally, for every data table in the database 102 that is associated with a blockchain, those blockchains can be copied among the blockchain nodes 202 in the blockchain infrastructure 104. In some embodiments, for example, every blockchain node 202 can contain a local copy of every blockchain that is associated with a data table. In other embodiments, different blockchains may be replicated among different subsets of the blockchain nodes 202. For example, a blockchain associated with one data table may be replicated only among nodes 1, 3, and 5, while a blockchain associated with another data table may be replicated only among nodes 1, 2, and 4. Further, a node can contain a full set of the records in a data table or only a subset; for example, node 1 may contain the first half of the data table, node 3 may contain the second half of the data table, and node 5 may contain the full data table.

In some embodiments, one of the blockchain nodes 202 (e.g., node 1) can be in data communication with the persistent queue 106. As discussed below, the blockchain node 202 connected to the persistent queue 106 can dequeue data and broadcast the dequeued data to the blockchain infrastructure 104, and thus can be referred to as the "initiator node." In some embodiments, the initiator node can be static; e.g., it is always node 1. In other embodiments, the initiator node can be dynamically assigned, changing from one blockchain node 202 to another, for example, randomly assigned, in round robin fashion, etc.

FIG. 2 shows users accessing various blockchain nodes 202 to illustrate that users can access the data in a blockchain associated with a data table. In accordance with the present disclosure, users can read the local copy of a blockchain and users can write to the local copy of a blockchain. This aspect of the present disclosure is discussed below.

The discussion will now turn to a description of details of a blockchain in accordance with embodiments of the present disclosure.

Figure 3:
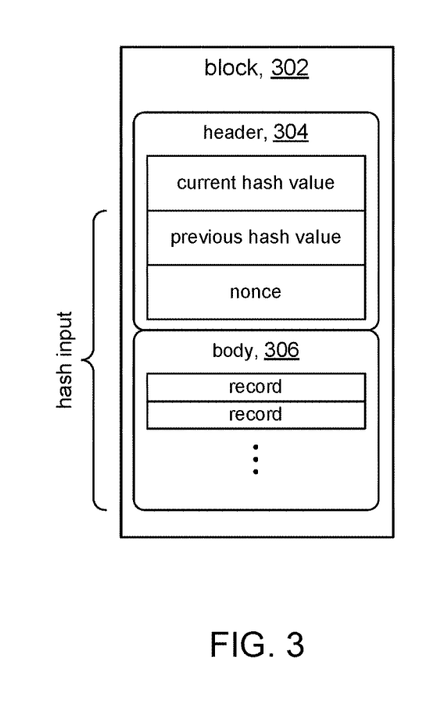
FIGS. 3 and 4 depict an illustrative embodiment of a blockchain in accordance with the present disclosure.
Figure 4:
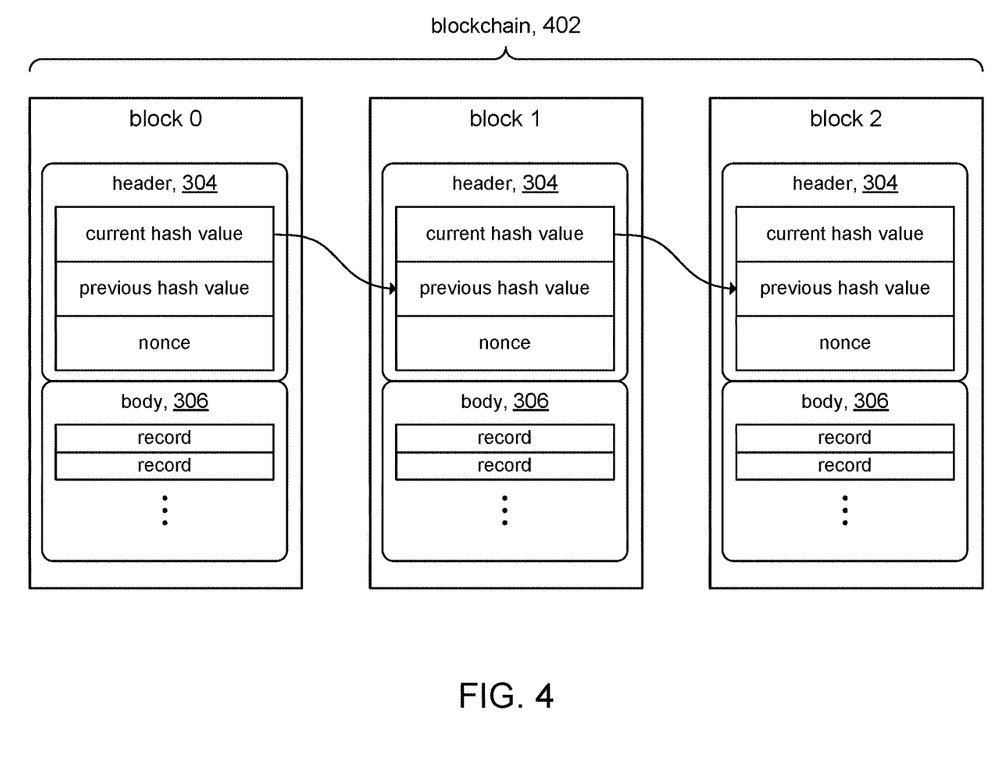

Referring to FIGS. 3 and 4, a blockchain 402 comprises a set of linked blocks 302. A block 302 can include a header portion 304 and a body portion 306. The header 304 can include data fields including for example: a current hash value field, a previous hash value field, and a nonce field. It will be appreciated that the header 304 can include other information (metadata) that describe the block 302, such as block version, block size, timestamp, etc. The body 306 contains data from the data table associated with the blockchain 402. Each block 302 in the blockchain 402 can store some amount of data from the associated data table. In some embodiments, for example, the body 306 can be defined to hold a fixed amount of data from its associated data table; e.g., n bytes of data, n rows of data (records), etc. The block size can be based on the record size of its associated data table. In other embodiments, the size of the body 306 can vary from one block 302 in the blockchain 402 to another.

The current hash value field can be computed by computing a hash value of a combination of the data stored in the body 306, the data in the previous hash value field, and the data that comprises the nonce field. The nonce is used to produce a certain characteristic in the computed hash value. One such characteristic, for example, is that the computed hash value begins with four consecutive 0's. In some embodiments, computing the hash value can be an iterative process whereby the nonce is varied with each iteration until the computed hash value exhibits a predetermined characteristic. For instance, the nonce can be initialized to '0' at the beginning of the process. The hash values is computed with nonce=0. If the computed hash value does not begin with four 0's, then increment the nonce by '1' and recompute the hash value. The process is repeated until the computation results in a hash value that begins with four 0's. That hash value can then be used as the current hash value for the block 302.

FIG. 4 illustrates an example of the chaining blocks 302 to form the blockchain 402. In some embodiments, for example, the current hash value of a block (e.g., block 0) can be copied into the previous hash value field of a subsequent block (e.g., block 1), thus linking or otherwise relating the block 0 and block 1. The current hash value of block 1 can be copied into the previous hash value field of subsequent block 2, and so on, thus forming the blockchain 402.

Figure 5:
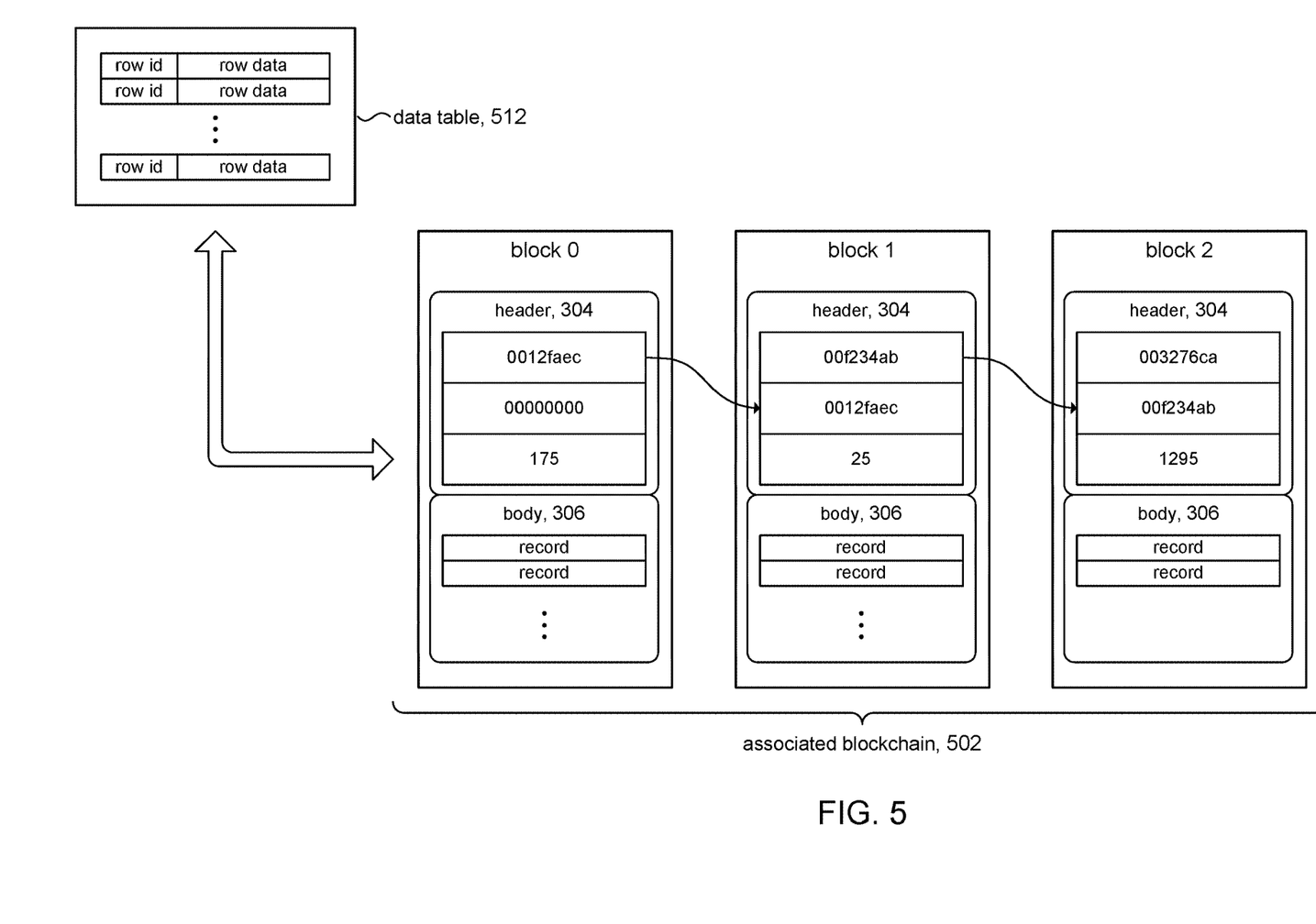
FIG. 5 illustrates an example of a data table and its associated blockchain in accordance with embodiments of the present disclosure.

FIG. 5 shows a more concrete example of a blockchain, in which a data table 512 is associated with a blockchain 502. The data table 512 contains rows of data (records). The blockchain 502 contains blocks (block 0, 1, 2, etc.) that store the contents of the data table 512. In some embodiments, for example, entire data rows in the data table 512 can be stored in the blockchain 502. In other embodiments, only certain fields (columns) of the data table 512 may be stored in the blockchain 502. FIG. 5 shows without loss of generality that the blockchain 502 stores entire rows of the data table 512.

The body portion 306 in each block in the blockchain 502 can be assumed to contain n data rows, so block 0 would contain the first n data rows of data table 512, block 1 contains the next n data rows of data table 512, and so on. Block 0 is the first block in the blockchain 502 and can be referred to as the genesis block.

The header portion 304 in each block in the blockchain 502 provides linkage among the blocks 0, 1, 2, etc. As explained in connection with FIG. 4, the current hash field of one block (e.g., '0012faec' in block 0) is stored in the previous hash field in the next block, namely block 1. In the illustrative example in FIG. 5, the nonce is used to produce hash values (expressed in hexadecimal notation) having a characteristic or property that the hash values lead with two 0's. In block 0, for example, the current hash value can be computed based on: the data in the previous hash field (namely, '00000000'); the data in the body 306; and a nonce value of '175' to produce for example a hexadecimal hash value '0012faec'. Since block 0 is the first block, there is no previous block and so its previous hash value field can be set to all 0's, as shown in FIG. 5. The current hash value for each block in the blockchain 502 can be similarly computed.

Figure 6:
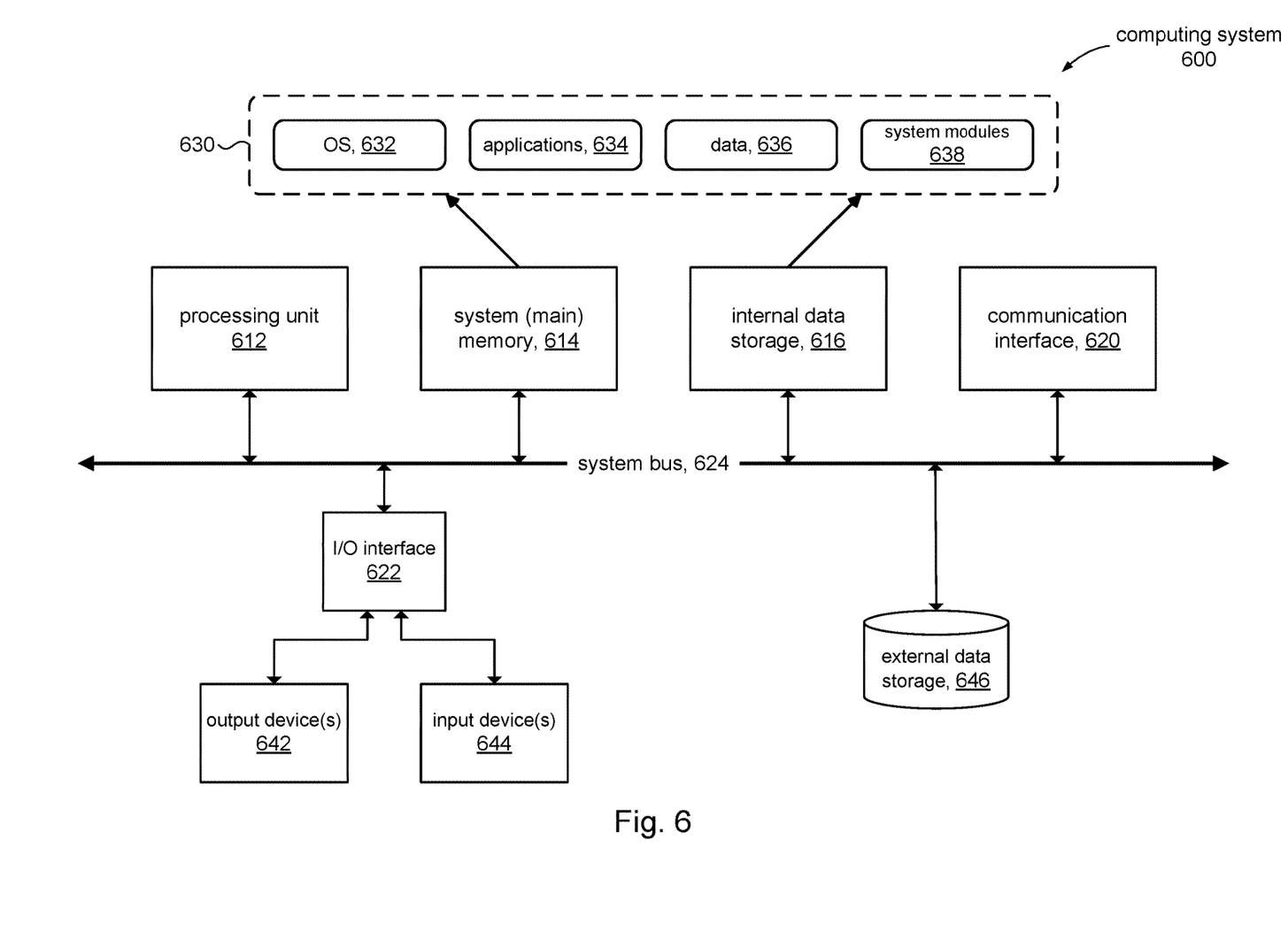
FIG. 6 is a high level diagram of computer system that can be used in embodiments of the present disclosure.

FIG. 6 is a simplified block diagram of an illustrative computing system 600 for implementing one or more of the embodiments described herein (e.g., database 102, FIG. 1, blockchain nodes 202, FIG. 2). The computing system 600 can perform and/or be a means for performing, either alone or in combination with other elements, operations in accordance with the present disclosure. Computing system 600 can also perform and/or be a means for performing any other steps, methods, or processes described herein.

Computing system 600 can include any single- or multi-processor computing device or system capable of executing computer-readable instructions. Examples of computing system 600 include, for example, workstations, laptops, servers, distributed computing systems, and the like. In a basic configuration, computing system 600 can include at least one processing unit 612 and a system (main) memory 614.

Processing unit 612 can comprise any type or form of processing unit capable of processing data or interpreting and executing instructions. The processing unit 612 can be a single processor configuration in some embodiments, and in other embodiments can be a multi-processor architecture comprising one or more computer processors. In some embodiments, processing unit 612 can receive instructions from program and data modules 630. These instructions can cause processing unit 612 to perform operations in accordance with the various disclosed embodiments (e.g., FIGS. 7-12) of the present disclosure.

System memory 614 (sometimes referred to as main memory) can be any type or form of storage device or storage medium capable of storing data and/or other computer-readable instructions, and comprises volatile memory and/or non-volatile memory. Examples of system memory 614 include any suitable byte-addressable memory, for example, random access memory (RAM), read only memory (ROM), flash memory, or any other similar memory architecture. Although not required, in some embodiments computing system 600 can include both a volatile memory unit (e.g., system memory 614) and a non-volatile storage device (e.g., data storage 616, 646).

In some embodiments, computing system 600 can include one or more components or elements in addition to processing unit 612 and system memory 614. For example, as illustrated in FIG. 6, computing system 600 can include internal data storage 616, a communication interface 620, and an I/O interface 622 interconnected via a system bus 624. System bus 624 can include any type or form of infrastructure capable of facilitating communication between one or more components comprising computing system 600.

Internal data storage 616 can comprise non-transitory computer-readable storage media to provide nonvolatile storage of data, data structures, computer-executable instructions, and so forth to operate computing system 600 in accordance with the present disclosure. For instance, the internal data storage 616 can store various program and data modules 630, including for example, operating system 632, one or more application programs 634, program data 636, and other program/system modules 638 to implement structures comprising buffer tree 106 and to support and perform various processing and operations disclosed herein.

Communication interface 620 can include any type or form of communication device or adapter capable of facilitating communication between computing system 600 and one or more additional devices. For example, in some embodiments communication interface 620 can facilitate communication between computing system 600 and a private or public network including additional computing systems. Examples of communication interface 620 include, for example, a wired network interface (such as a network interface card), a wireless network interface (such as a wireless network interface card), a modem, and any other suitable interface.

In some embodiments, communication interface 620 can also represent a host adapter configured to facilitate communication between computing system 600 and one or more additional network or storage devices via an external bus or communications channel.

Computing system 600 can also include at least one output device 642 (e.g., a display) coupled to system bus 624 via I/O interface 622, for example, to provide access to an administrator. The output device 642 can include any type or form of device capable of visual and/or audio presentation of information received from I/O interface 622.

Computing system 600 can also include at least one input device 644 coupled to system bus 624 via I/O interface 622, e.g., for administrator access. Input device 644 can include any type or form of input device capable of providing input, either computer or human generated, to computing system 600. Examples of input device 644 include, for example, a keyboard, a pointing device, a speech recognition device, or any other input device.

Computing system 600 can also include external data storage subsystem 646 coupled to system bus 624. In some embodiments, the external data storage 646 can be accessed via communication interface 620. External data storage 646 can be a storage subsystem comprising a storage area network (SAN), network attached storage (NAS), virtual SAN (VSAN), and the like. External data storage 646 can comprise any type or form of block storage device or medium capable of storing data and/or other computer-readable instructions.

Figure 7:
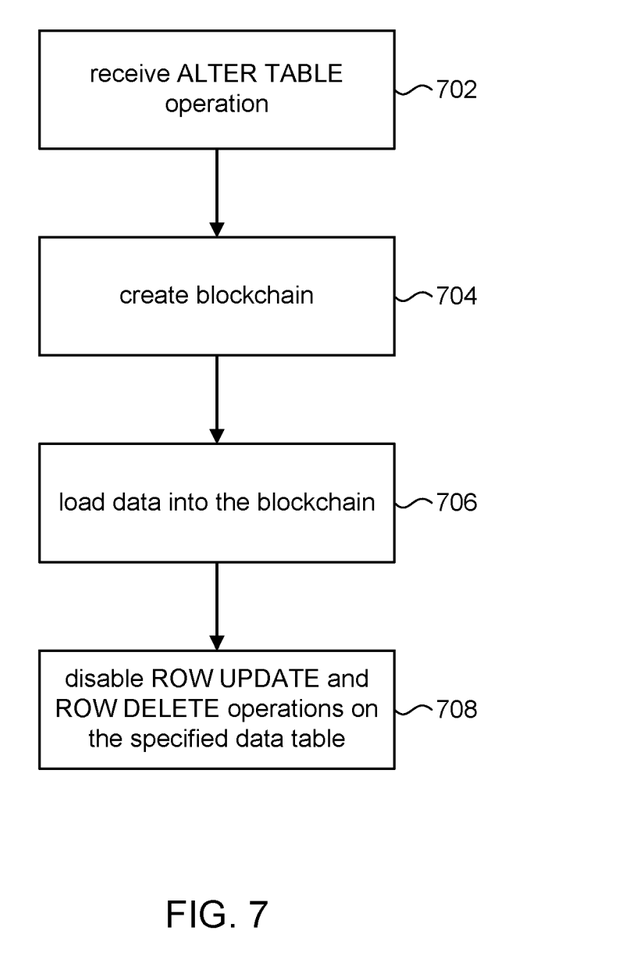
FIG. 7 illustrates a process flow for associating a data table with a blockchain.

Referring to FIG. 7, the discussion will now turn to a high level description of processing in the database 102 for associating a data table (e.g., 512) in the database with a blockchain (e.g., 502) in accordance with the present disclosure. We can assume, for discussion purposes and without loss of generality, that database 102 is an SQL database. In some embodiments, the database 102 can include computer executable program code, which when executed by a computer system (e.g., 602, FIG. 6), can cause the computer system to perform processing in accordance with FIG. 7. The flow of operations performed by the computer system is not necessarily limited to the order of operations shown.

At operation 702, the database 102 can receive an ALTER TABLE operation that specifies associating a blockchain 502 with a specified data table. In some embodiments, for example, the SQL operation can look like the following:

ALTER TABLE SRC_SCHEMA. TAB1 ADD BLOCKCHAIN where SRC_SCHEMA. TAB1 specifies the data table TAB1 in database schema SRC_SCHEMA. The operation can be issued by an administrative user, for example. The data table can contain many different types of data including text, multi-media files, computer executable code, etc.

At operation 704, the database 102 can create a blockchain 502 that is associated with the specified data table 512. In some embodiments, for example, database 102 can communicate with one of the blockchain nodes 202 in the blockchain infrastructure 104 to create the blockchain 502; for instance, the database 102 can communicate with the blockchain node connected to the persistent queue 106 (e.g., node 1, FIG. 2). Information in the table schema for the specified data table 512 can be used to define various aspects of the blockchain 502. For example, information about the sizes of the data fields in the specified data table 512 can be used to determine a block size for the body portion 306 of the blocks that comprise the blockchain 502.

At operation 706, the database 102 can perform an initial data load of the blockchain 502. In some embodiments, for example, the database 102 can enqueue every row of data in the specified data table onto the persistent queue 106, where an initiator node (e.g., node 1) in the blockchain infrastructure 104 can dequeue the data and insert the dequeued data into the newly created blockchain 502. In other embodiments, the database 102 can communicate directly with the blockchain infrastructure 104 to perform a one-time initial batch load of the data in the specified data table, such as illustrated in FIG. 1 for example.

At operation 708, the database 102 can disable certain operations on the specified data table. For example, initially, when the specified data table is not associated with a blockchain, various operations such as INSERT, ROW UPDATE, SELECT, JOIN, ROW DELETE and so on can be performed. However, when the specified data table is associated with a blockchain, updating existing records in the data table or deleting existing records in the data table can result in de-synchronizing the data that is stored the data table and the data that is stored in its associated blockchain. Accordingly, when the specified data table is associated with a blockchain, the ROW UPDATE and ROW DELETE operations on the specified data table can be disabled, leaving at most a subset of the original operations that can be performed (e.g., in our example above, the subset would include operations such as INSERT, SELECT, JOIN, and so on) on the data table.

Figure 8:
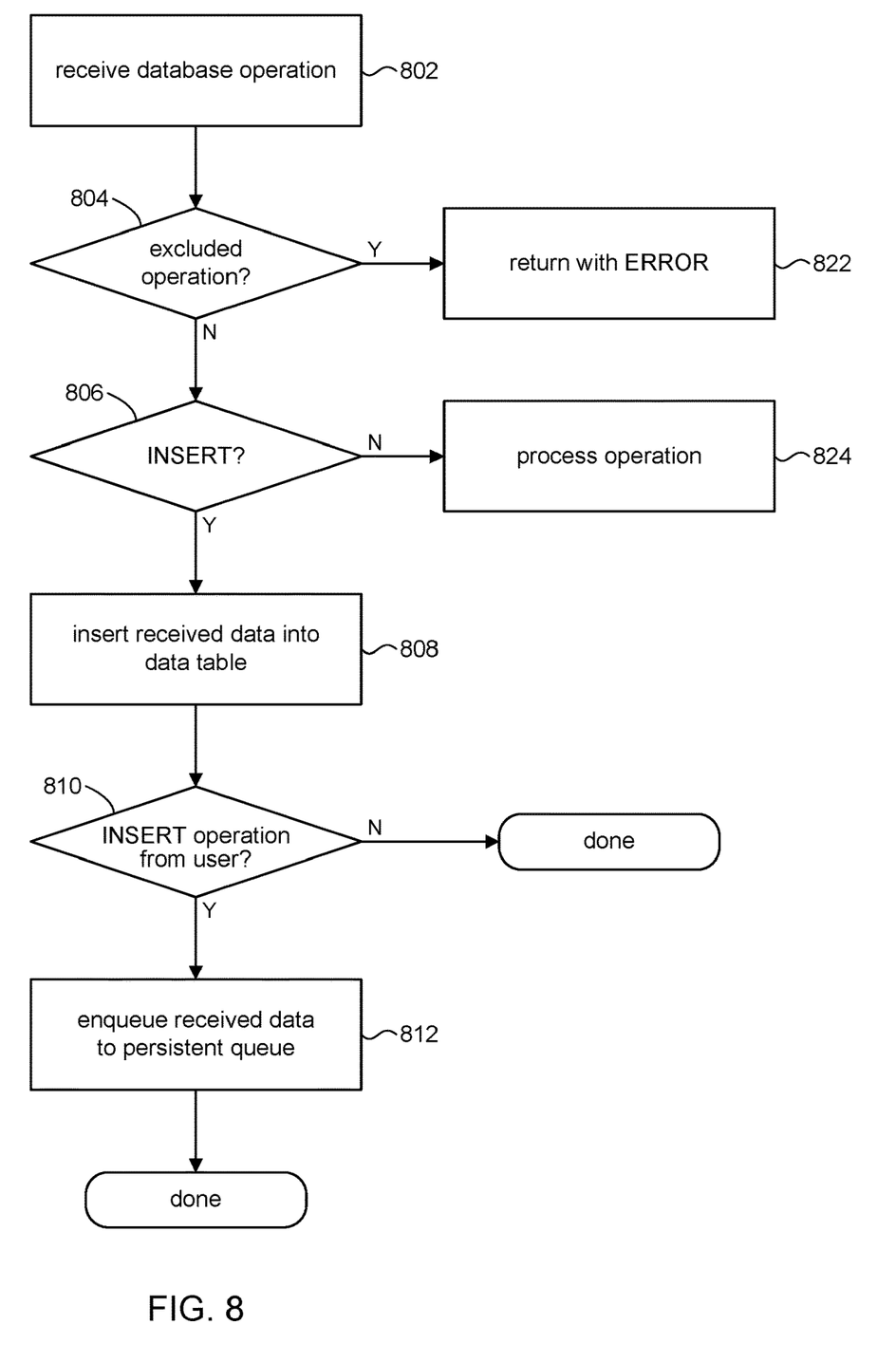
FIG. 8 illustrates processing in a database in accordance with the present disclosure.

Referring to FIG. 8, the discussion will now turn to a high level description of processing in the database 102 for processing database operations in accordance with the present disclosure. We can assume, for discussion purposes and without loss of generality, that database 102 is a relational database and the database operations are in an SQL syntax. In some embodiments, the database 102 can include computer executable program code, which when executed by a computer system (e.g., 602, FIG. 6), can cause the computer system to perform processing in accordance with FIG. 8. The flow of operations performed by the computer system is not necessarily limited to the order of operations shown.

At operation 802, the database 102 can receive a database operation. For the purposes of explaining the flow in FIG. 8, we will assume that the database operation specifies a data table (e.g., 512), and that the specified data table is already associated with a blockchain (e.g., 502), for example per processing via FIG. 7. The data table 512 can be referred to as being in an "associated state."

At operation 804, the database 102 can determine whether the database operation is an excluded operation. As alluded to above in FIG. 7, an "excluded" operation is an operation that is disabled or otherwise not performed on a data table 512 when that data table is associated with a blockchain 502. In some embodiments, excluded operations can include ROW UPDATE and ROW DELETE operations, although in other embodiments excluded operations can include additional operations. If the operation is excluded, then processing can proceed to operation 822, discussed below; otherwise, processing can proceed to operation 806.

At operation 806, the database 102 can determine whether the database operation is a ROW INSERT operation in which data received along with the database operation is inserted into the specified data table 512. If the database operation is not a ROW INSERT operation, then processing can proceed to operation 824, discussed below; otherwise, processing can proceed to operation 808.

At operation 808, the database 102 can insert the received data into the specified data table 512. For example, in embodiments, some data tables in the database 102 may be implemented as a B-tree, and so the insertion operation amounts to a B-tree insertion. It will be appreciated, of course, that data tables can be implemented with any suitable data structure.

At operation 810, the database 102 can determine whether the ROW INSERT operation originated from a user or from the blockchain infrastructure 104. As explained in operation 806, a user for example, can directly add data to the specified data table 512 by issuing a ROW INSERT operation directly to the database 102. For example, the SQL commands INSERT INTO Customers VALUES (7, "Hasso Plattner", "Germany")

can be used to insert the data specified in the VALUES attributes into the Customer data table in a selected database schema. When the ROW INSERT operation originates from a user, processing can continue to operation 812 to add the received data to the associated blockchain 502. In certain cases, additional information may be written to the data table so only data in some of data table fields is the same in the data table and blockchain.

On the other hand, in accordance with the present disclosure, a user can indirectly add data to the specified data table 512 by adding the data directly to its associated blockchain 502, for example, by communicating with one of the blockchain nodes in the blockchain infrastructure 104. This aspect of the present disclosure is discussed below. As part of the processing performed by the blockchain infrastructure 104, a blockchain node 202 can issue a similar ROW INSERT operation to the database 102 to insert the data that was provided directly to the blockchain node. Accordingly, when the ROW INSERT operation originates from a blockchain node, processing of the received ROW INSERT operation can be deemed complete.

At operation 812, the database 102 can enqueue the received data to the persistent queue 106, where the blockchain infrastructure 104 at the other end of the persistent queue 106 can dequeue data and add the data to the associated blockchain 502. This aspect of the present disclosure is discussed below. Processing of the received ROW INSERT operation can be deemed complete.

At operation 822, the database 102 can return an ERROR response in response to detecting an excluded operation (decision block 804) when the specified data table 512 is in the associated state. Such data operations will change the state of existing data in the specified data table 512, so performing such database operations will de-synchronize the data stored in the specified data table 512 and the data stored in the associated blockchain 502. Accordingly, such excluded database operations are not performed.

At operation 824, the database 102 can process a non-excluded database operation other than a ROW INSERT operation (decision block 806). Typical database operations may include read-only operations such a JOIN and SELECT operations. These database operations do not change the state of existing data in the specified data table 512, so performing such database operations will not de-synchronize the data stored in the specified data table 512 and the data stored in the associated blockchain 502.

Figure 9:
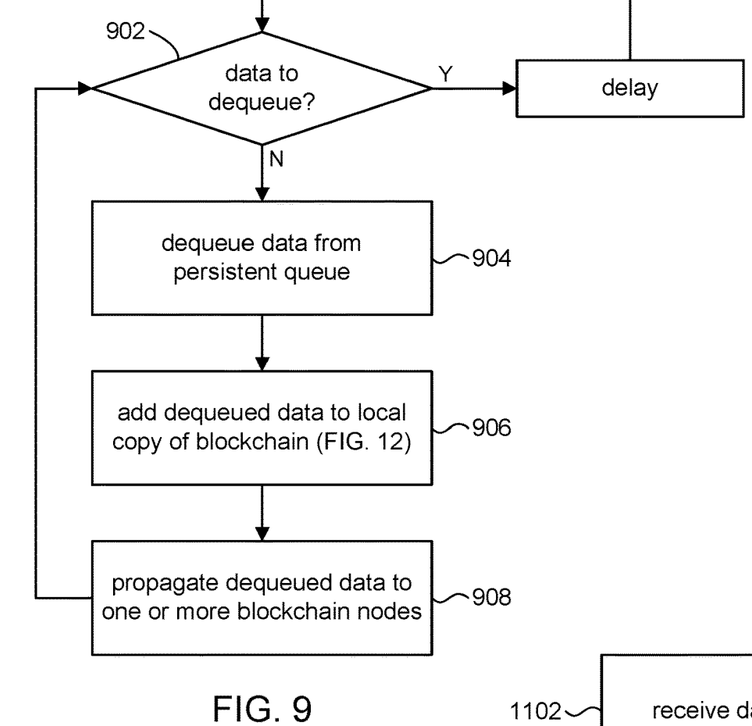
FIGS. 9-11 illustrate processing in blockchain nodes in accordance with the present disclosure.

Referring to FIG. 9, the discussion will now turn to a high level description of processing in an initiator node (e.g., node 1, FIG. 2) for adding data from the persistent queue 106 to the blockchain 502 in accordance with the present disclosure. The flow shown in FIG. 9 describes the processing for adding data from a given data table (e.g., 512) to its associated blockchain (e.g., 502). In some embodiments, the initiator node can include computer executable program code, which when executed by a computer system (e.g., 602, FIG. 6), can cause the computer system to perform processing in accordance with FIG. 9. The flow of operations performed by the computer system is not necessarily limited to the order of operations shown. In some embodiments, the initiator node can also perform monitoring of table events.

At operation 902, the initiator node can access the persistent queue 106 to determine whether there is any data to dequeue and insert into the blockchain 502 associated with the data table 512 that the dequeued data comes from. If there is no data to dequeue, then the initiator node can delay for some period of time before re-accessing the persistent queue 106. If there is data, the processing can proceed to operation 904.

At operation 904, the initiator node can dequeue data from the persistent queue 106. The initiator node can dequeue one row of data at a time, or a batch of data rows at a time. In some embodiments, for example, the initiator node can dequeue a batch of up to n rows or records of data per cycle. Batch processing can be more efficient than processing one row of data at a time. In some embodiments, where a given blockchain is replicated among only some of the blockchain nodes 202, operation 904 can include the initiator node making a determination whether it contains a local copy of the blockchain that is associated with the data table that contains the dequeued data. If not, then processing can proceed directly to operation 908.

At operation 906, the initiator node can add the dequeued row(s) of data to its local copy of the blockchain 502. This process is discussed in more detail below, in FIG. 12.

At operation 908, the initiator node can propagate the dequeued data to one or more other blockchain nodes 202 in the blockchain infrastructure 104. In some embodiments, for example, the initiator node can broadcast the dequeued data to all blockchain nodes 202 in the blockchain infrastructure 104; i.e., the blockchain 502 is replicated in all nodes. In other embodiments, the initiator node may broadcast the dequeued data to a fixed subset of the blockchain nodes 202; i.e., the blockchain 502 is replicated in only some of the nodes. The broadcast message can include the data and other supporting information such as, for example, information that identifies the blockchain to which the data is to be added. Processing of the dequeued data can be deemed complete, and processing can return to operation 902 to continue processing data in the persistent queue 106.

Figure 10:
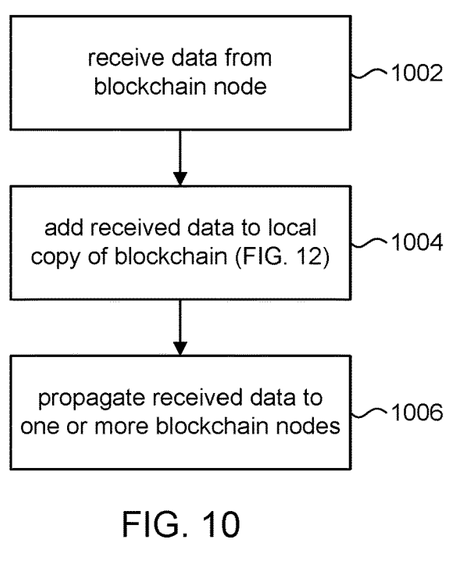

Referring to FIG. 10, the discussion will now turn to a high level description of processing in a blockchain node (e.g., 202, FIG. 2) for processing data received from another blockchain node in accordance with the present disclosure. In some embodiments, the receiving blockchain node can include computer executable program code, which when executed by a computer system (e.g., 602, FIG. 6), can cause the computer system to perform processing in accordance with FIG. 10. The flow of operations performed by the computer system is not necessarily limited to the order of operations shown.

At operation 1002, a receiving blockchain node can receive data from another blockchain node in the blockchain infrastructure 104. The received data can include information that identifies the blockchain to which the received data is to be added. In some embodiments, where a given blockchain is replicated among only some of the nodes in the blockchain infrastructure 104, this operation can include the receiving blockchain node making a determination whether it contains a local copy of the identified blockchain. If not, then processing can proceed directly to operation 1006.

At operation 1004, the receiving blockchain node can add the received data to its local copy of the blockchain 502. The process is discussed in more detail below, in FIG. 12.

At operation 1006, the receiving blockchain node can propagate the received data to one or more other blockchain nodes 202 in the blockchain infrastructure 104. In some embodiments, for example, the receiving blockchain node can broadcast the dequeued data to all blockchain nodes 202. In other embodiments, the receiving blockchain node may broadcast the dequeued data to a fixed subset of the blockchain nodes 202. The broadcast message can include the received data and other supporting information such as, for example, information that identifies the blockchain to which the data is to be added. Each receiving node can process the received broadcast data according to the flow just described. Processing of the received data can be deemed complete.

It can be appreciated that the propagating operations in FIGS. 9 and 10 can ensure that all local copies of a blockchain associated with a data table are eventually synchronized with data that is inserted into the data table associated with that blockchain.

Figure 11:
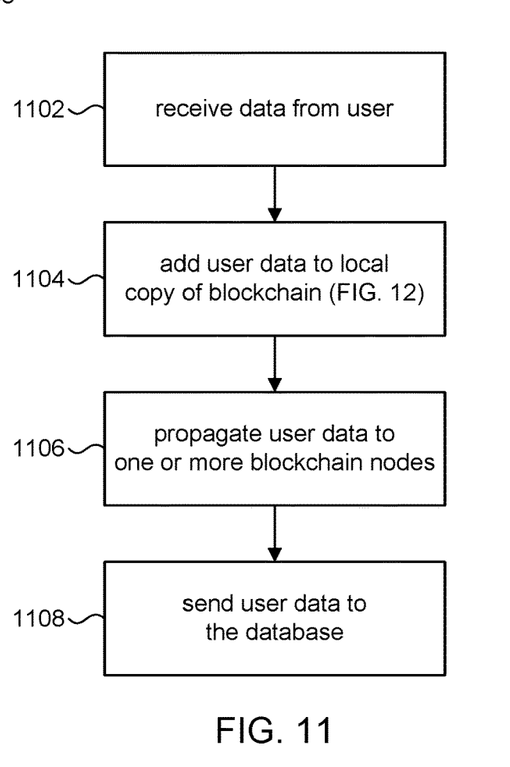

Referring to FIG. 11, the discussion will now turn to a high level description of processing in a blockchain node (e.g., nodes 2, 3, 5, FIG. 2) for processing data received from a user in accordance with the present disclosure. In some embodiments, such a blockchain node (user-accessed node) can include computer executable program code, which when executed by a computer system (e.g., 602, FIG. 6), can cause the computer system to perform processing in accordance with FIG. 11. The flow of operations performed by the computer system is not necessarily limited to the order of operations shown.

At operation 1102, a user-accessed node can receive data from user who directly accesses the blockchain node (e.g., node 2). In some embodiments, the user can interact with the blockchain node via a suitable interface (e.g., a web-based interface) to input data. For example, the user can specify data table in the database 102 that they want to provide data to. The user-accessed node can then identify the blockchain that is associated with the specified data table. In some embodiments, where a given blockchain is replicated among only some of the nodes in the blockchain infrastructure 104, this operation can include the receiving blockchain node making a determination whether it contains a local copy of the identified blockchain. If not, then processing can proceed directly to operation 1106; otherwise, processing can proceed to operation 1104.

This aspect of the present disclosure enables a user to be given limited access to the database 102, vis-à-vis certain "public" data tables, without granting direct access to the database 102. This can provide a measure of security in use cases where the database 102 contains sensitive information (e.g., medical records, financial data, enterprise proprietary information, etc.) in addition to the data in the public data tables. Since any user can gain access to any blockchain node 202 in the blockchain infrastructure 104 and insert their data without being given a priori access to the database 102, administrative overhead can be reduced by obviating the need to administer temporary login accounts just so users can access those public data tables.

At operation 1104, the user-accessed node can add the user-provided data to its local copy of the identified blockchain. The process is discussed in more detail below, in FIG. 12.

At operation 1106, the user-accessed node can propagate the user-provided data to one or more other blockchain nodes 202 in the blockchain infrastructure 104. In some embodiments, for example, the user-accessed node can broadcast the user-provided data to all blockchain nodes 202. In other embodiments, the user-accessed node may broadcast the user-provided data to a fixed subset of the blockchain nodes 202. The broadcast message can include the user-provided data and other supporting information such as, for example, information that identifies the blockchain to which the data is to be added. Each receiving node can process the received data according to the flow in FIG. 10.

At operation 1108, the user-accessed node can send the user-provided data to the database 102 to be inserted into the data table specified by the user. In some embodiments, for example, the user-accessed node can communicate with the database 102 to insert a record into the specified data table. Merely to illustrate, suppose a data table Transactions in database 102 is defined according to:

```
CREATE TABLE Transactions (
  TransactionNumber varchar(255),
  SenderAddress varchar(255),
  ReceiverAddress varchar(255),
  RowData varchar255),
  CreatedOn timestamp
);
```

The following code fragment can be executed to insert a record into the database 102:

```
char sql [1000];
sprintf ("INSERT INTO Transactions
VALUES ('%s','%s','%s','%f','%s')",
"cfabc710e696965484b60a69e8ab",
"8cfe3e5671Q9H4vd",
"FSKw5TRCt3NrhpNH6",
"This is data from the user.",
"2018-06-11 09:03:47");
SQLExecDirect(sql);
``` where the sprintf( ) function call creates the INSERT operation in the sql buffer with appropriate attributes to insert the user-provided data into the specified data table. The SQL statement SQLExecDirect(sql) following the sprintf( ) function call communicates the INSERT operation to the database 102. Referring back to operation 810 in FIG. 8, we can see that this INSERT operation need not be enqueued to the persistent buffer 106 for processing by the blockchain infrastructure 104, since it came from the blockchain infrastructure.

In some embodiments, the INSERT operation can be cached, for example in a persistent cache. The cache can serve to ensure consistency of data between the data table and its associated blockchain in the event of a system outage before the database 102 is able to update the data table. At the end of the processing shown in FIG. 11, the data table and its associated blockchain synchronized; i.e., contain the same user-provided data.

Figure 12:
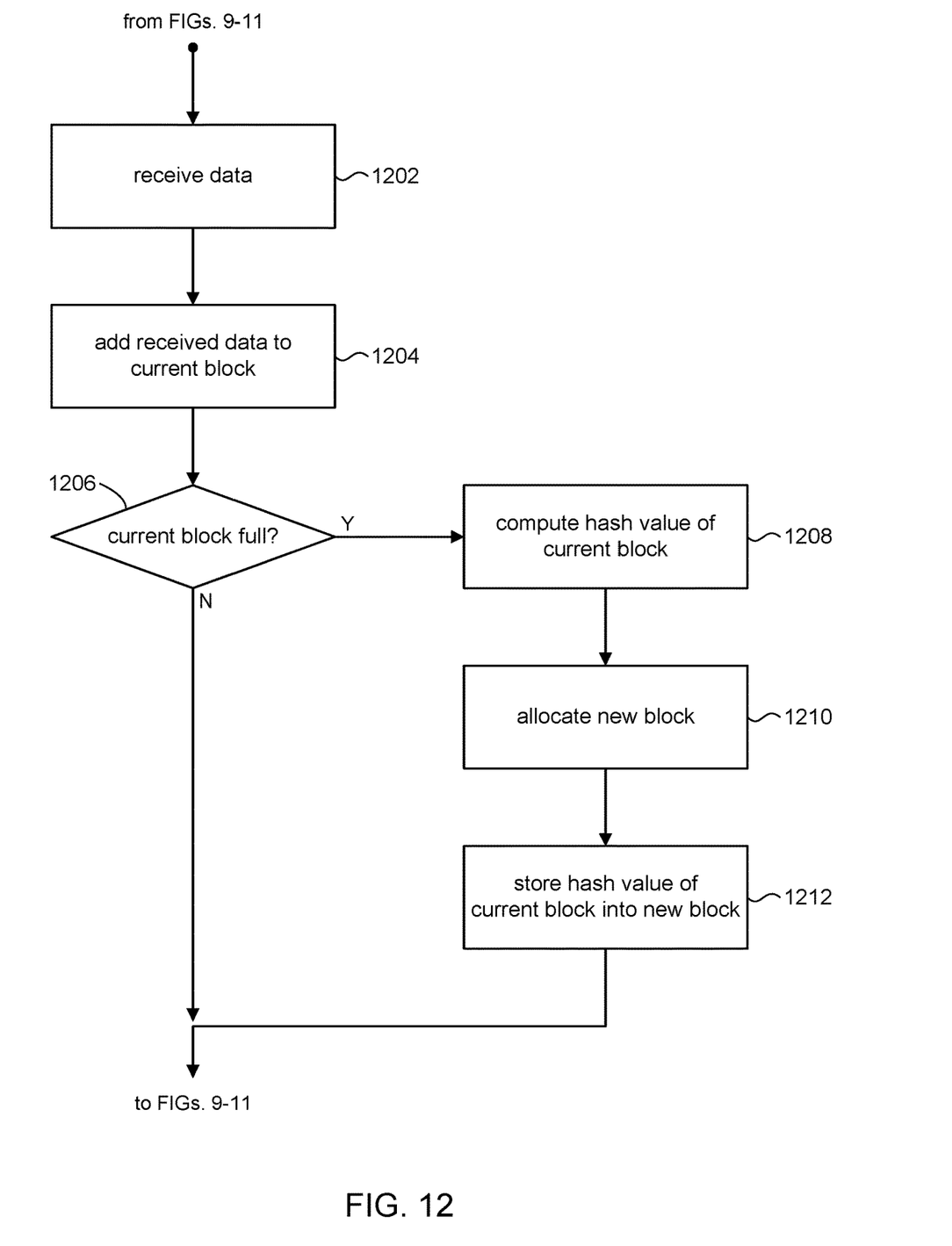
FIG. 12 illustrates processing a blockchain in accordance with the present disclosure.

Referring to FIG. 12, the discussion will now turn to a high level description of processing in a blockchain node 202 to process a blockchain insert operation for adding received data to its local copy of the blockchain (e.g., 502) in accordance with the present disclosure. In some embodiments, the blockchain node 202 can include computer executable program code, which when executed by a computer system (e.g., 602, FIG. 6), can cause the computer system to perform processing in accordance with FIG. 12. The flow of operations performed by the computer system is not necessarily limited to the order of operations shown.

At operation 1202, the blockchain node 202 can receive data. In some instances, the blockchain node 202 can receive data by way of another blockchain node broadcasting the data. In other instances, the blockchain node 202 can be the initiator node connected to the persistent queue 106, and in still other instances the data may come from a user who directly accesses the blockchain node 202. The received data can include information that identifies the blockchain, or in the case of user-provided data, the user can identify a data table which can then be used to identify the associated blockchain.

At operation 1204, the blockchain node 202 can add the received data to the body portion 306 (FIG. 3) of the current block in the local copy of the identified blockchain. In some embodiments, the received data can be encrypted/digitally signed. All the data can be encrypted, or only some of the data can be encrypted. In some embodiments, the current hash value field (FIG. 3) in the current block can be updated with a hash value computed based on the current contents of the body portion 306, the previous hash value field, and a nonce value that produces a hash value having a predetermined characteristic (e.g., four leading 0's) as explained above.

At operation 1206, the blockchain node 202 can determine whether the current block is full. In some embodiments, for example, "full" can mean that the body of the current block contains a maximum number of bytes or a maximum number of data rows (records). If the current block is not deemed to be full, the processing can be deemed complete; otherwise, processing can proceed to operation 1208 to process a full block.

At operation 1208, the blockchain node 202 can begin processing a full block by computing a final hash value to be placed in the current hash value field of the block.

At operation 1210, the blockchain node 202 can allocate a new block.

At operation 1212, the blockchain node 202 can store the current hash value computed at operation 1208 into the previous hash value field of the newly allocated block; see, for example, block 0 and block 1 in FIG. 3. The newly allocated block becomes the new "current" block on the next iteration when the blockchain node 202 receives the next amount of data. Processing of the received data can be deemed complete. The chain continues to grow with subsequent iterations of the processing of FIG. 12.

Conclusion

Embodiments in accordance with the present disclosure provide a database system that can be tightly integrated with blockchain technology. Certain database operations (e.g., UPDATE and DELETE) can be prohibited at the database level, and in particular on constituent data tables that are associated with respective blockchains. The benefits from such integration cannot be achieved by simply adding a blockchain system to an existing database, or vice versa by adding a database to an existing blockchain system.

Embodiments in accordance with the present disclosure combine the benefits of relational databases and blockchains. New blockchains can be created by simply running a single database command. The resulting hybrid solution retains the full performance and features of a relational database (joins, indexes, SQL access, etc.) even when blockchain data is encrypted. At the same time, blockchain's main features such as immutability and preservation of record order are also retained and even enhanced: for example, the system can perform SQL joins between data tables and data stored in different blockchains, and do so with the speed of a relational database, not achievable even theoretically by blockchain-only solutions.

The integration of blockchain technology with a database can enhance the data security in the database because of the immutable nature of blockchains. Referring back to FIG. 4, for example, we see that the current and previous hash values between blocks 0, 1, 2 are linked. The current hash value in block 0 is stored as the previous hash value in block 1, and so on. Moreover, the current hash value in a given block (e.g., block 1) is function of its previous hash value field in addition to the data in that block. If an attempt is made to change records in a block block 0), that block's current hash value would be different thus invalidating the hash information in the subsequent block (block 1), and so on. In other words, any change to the contents of a previous block in the chain would invalidate the data in all blocks after it. This immutable property means the data stored in the blocks cannot be edited, adjusted or changed, or at least not readily achieved.

The decentralized nature of the blockchain means that no single entity can take control of the information on the blockchain. The transactions recorded in the chain therefore can be publicly published and verified, such that anyone can view the contents (e.g., to perform audits) of the blockchain and verify that events that were recorded into it actually took place.

In some embodiments, the blockchain infrastructure 104 can use a consensus mechanism to before adding a block to the chain to avoid maliciously adding data rows to the blockchain. However, if the blockchain infrastructure 104 is implemented in a private network, the additional complexity and reduced throughput due to a consensus mechanism can be avoided, which can be desirable in a dynamic environment, such as in a live database for example.

In some embodiments, audits can be performed periodically by the database 102 to double-check that the data in a given data table and its associated blockchain are the same. The results of such audit may be summarized in a report.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a database comprising a plurality of data tables, the method comprising:
    performing any one of a plurality of database operations on one of the data tables when the data table is not associated with a blockchain;
    associating the data table with a blockchain (associated state), wherein data comprising the data table are replicated in the blockchain;
    performing at most only a subset of the plurality of database operations on the data table subsequent to associating the data table with the blockchain; and
    processing a row insert operation to insert data specified in the row insert operation into the data table when the data table is in the associated state, including performing a first operation to insert the specified data into the data table and a second operation to add the specified data to a blockchain that is associated with the data table, wherein the first operation includes enqueuing the specified data to a queue and the second operation includes dequeuing data from the queue and adding the dequeued data to the blockchain, and
    wherein the queue is defined for the data table, and a different queue is defined for another data table of the plurality of data tables.

2. The method of claim 1, wherein enqueuing data to the queue occurs independently of dequeuing data from the queue.

3. The method of claim 1, further comprising generating an ERROR response in response to receiving a row update operation or a row delete operation when the data table is in the associated state, and neither a received row update operation nor a received row delete operation are performed on the data table.

4. The method of claim 1, further comprising receiving an ALTER TABLE operation on the data table when the data table is not associated with a blockchain, and in response:
    instantiating a blockchain to be associated with the data table; and
    adding data from the data table into the blockchain.

5. The method of claim 1, wherein the queue is also defined for a set of data tables of the plurality of data tables.

6. A non-transitory computer-readable storage medium having stored thereon computer executable instructions, which when executed by a computer device, cause the computer device to:
    perform any one of a plurality of database operations on one of the data tables when the data table is not associated with a blockchain;
    associate the data table with a blockchain (associated state), wherein data comprising the data table are replicated in the blockchain;
    perform at most only a subset of the plurality of database operations on the data table subsequent to the data table being associated with the blockchain; and
    process a row insert operation to insert data specified in the row insert operation into the data table when the data table is in the associated state, including performing a first operation to insert the specified data into the data table and a second operation to add the specified data to a blockchain that is associated with the data table, wherein the first operation includes enqueuing the specified data to a queue and the second operation includes dequeuing data from the queue and adding the dequeued data to the blockchain, and wherein the queue is defined for the data table, and a different queue is defined for another data table of the plurality of data tables.

7. The non-transitory computer-readable storage medium of claim 6, wherein the computer executable instructions, which when executed by the computer device, further cause the computer device to generate an ERROR response in response to receiving a row update operation or a row delete operation when the data table is in the associated state, and neither a received row update operation nor a received row delete operation are performed on the data table.

8. The non-transitory computer-readable storage medium of claim 6, wherein the computer executable instructions, which when executed by the computer device, further cause the computer device to receive an ALTER TABLE operation on the data table when the data table is not associated with a blockchain, and in response to:

instantiate a blockchain to be associated with the data table; and add data from the data table into the blockchain.

9. The non-transitory computer-readable storage medium of claim 6, wherein the queue is also defined for a set of data tables of the plurality of data tables.

10. The non-transitory computer-readable storage medium of claim 6, wherein enqueuing data to the queue occurs independently of dequeuing data from the queue.

11. An apparatus comprising:

one or more computer processors; and a computer-readable storage medium comprising instructions for controlling the one or more computer processors to be operable to:

perform any one of a plurality of database operations on one of the data tables when the data table is not associated with a blockchain;

associate the data table with a blockchain (associated state), wherein data comprising the data table are replicated in the blockchain;

perform at most only a subset of the plurality of database operations on the data table subsequent to the data table being associated with the blockchain; and process a row insert operation to insert data specified in the row insert operation into the data table when the data table is in the associated state, including performing a first operation to insert the specified data into the data table and a second operation to add the specified data to a blockchain that is associated with the data table, wherein the first operation includes enqueuing the specified data to a queue and the second operation includes dequeuing data from the queue and adding the dequeued data to the blockchain, and wherein the queue is defined for the data table, and a different queue is defined for another data table of the plurality of data tables.

12. The apparatus of claim 11, wherein the computer-readable storage medium further comprises instructions for controlling the one or more computer processors to be operable to generate an ERROR response in response to receiving a row update operation or a row delete operation when the data table is in the associated state, and neither a received row update operation nor a received row delete operation are performed on the data table.

13. The apparatus of claim 11, wherein the computer-readable storage medium further comprises instructions for controlling the one or more computer processors to be operable to receive an ALTER TABLE operation on the data table when the data table is not associated with a blockchain, and in response to:

instantiate a blockchain to be associated with the data table; and add data from the data table into the blockchain.

14. The apparatus of claim 11, wherein the queue is also defined for a set of data tables of the plurality of data tables.

15. The apparatus of claim 11, wherein enqueuing data to the queue occurs independently of dequeuing data from the queue.

* * * * *